US007765168B1

(12) United States Patent
Dong et al.

(10) Patent No.: US 7,765,168 B1
(45) Date of Patent: Jul. 27, 2010

(54) METHOD AND APPARATUS FOR THE CONTROL AND DISTRIBUTION OF VALUE BEARING ITEMS IN A PC POSTAGE SYSTEM

(75) Inventors: Blake MingQi Dong, Rowland Heights, CA (US); Craig Leonard Ogg, Long Beach, CA (US)

(73) Assignee: Stamps.com, Los Angeles, CA (US)

(*) Notice: Subject to any disclaimer, the term of this patent is extended or adjusted under 35 U.S.C. 154(b) by 2028 days.

(21) Appl. No.: 09/944,534

(22) Filed: Aug. 31, 2001

Related U.S. Application Data

(60) Provisional application No. 60/230,044, filed on Sep. 1, 2000.

(51) Int. Cl.
*G06F 17/00* (2006.01)

(52) U.S. Cl. ....................................... 705/401; 705/403

(58) Field of Classification Search .......... 705/400–410
See application file for complete search history.

(56) References Cited

U.S. PATENT DOCUMENTS 4,811,234 A * 3/1989 Storace ....................... 705/403

(Continued)

FOREIGN PATENT DOCUMENTS

EP 0504843 A2 * 9/1992

OTHER PUBLICATIONS

Yakal, Kathy, Neopost's Simply Postage, the first PC-based postage system to hit the retail market, is a winner, May 4, 1999, PC Magazine, 49(1).*

*Primary Examiner*—Shannon S Saliard
(74) *Attorney, Agent, or Firm*—Christie, Parker & Hale, LLP

(57) ABSTRACT

A system and method for the control and distribution of expiring free postage in a PC postage system is disclosed. According to the invention, a predetermined portion of the expiring free postage is transferred to a postage meter and the remainder of the expiring free postage is stored in a free postage account that may be reset upon expiration of the free postage.

39 Claims, 8 Drawing Sheets

U.S. PATENT DOCUMENTS 4,831,555 A 5/1989 Sansone et al.
4,864,506 A * 9/1989 Storace ........................ 705/403
4,900,903 A 2/1990 Wright et al.
4,900,904 A 2/1990 Wright et al.
4,908,770 A 3/1990 Breault et al.
5,048,085 A 9/1991 Abraham et al.
5,111,030 A 5/1992 Brasington et al.
5,243,654 A * 9/1993 Hunter ........................ 380/51
5,454,038 A 9/1995 Cordery et al.
5,457,642 A * 10/1995 Brookner ................. 177/25.15
5,655,023 A 8/1997 Cordery et al.
5,715,164 A * 2/1998 Liechti et al. ............... 705/410
5,729,460 A * 3/1998 Plett et al. ................... 705/403
5,812,400 A * 9/1998 Eddy et al. .................. 705/410
5,819,240 A * 10/1998 Kara .......................... 705/408
5,822,739 A 10/1998 Kara
5,825,893 A 10/1998 Kara
6,050,486 A * 4/2000 French et al. ............... 235/101
6,321,214 B1 * 11/2001 Thiel .......................... 705/408
6,397,196 B1 * 5/2002 Kravetz et al. ................ 705/35
6,526,393 B1 * 2/2003 Fredman ..................... 705/408
6,619,544 B2 * 9/2003 Bator et al. ................. 235/381
6,868,406 B1 * 3/2005 Ogg et al. ...................... 705/60
6,970,856 B1 * 11/2005 Heiden et al. ............... 705/408
7,085,725 B1 * 8/2006 Leon ............................. 705/1
2002/0023057 A1 * 2/2002 Goodwin et al. .............. 705/50
2002/0059145 A1 * 5/2002 Leon ........................... 705/60

* cited by examiner

METHOD AND APPARATUS FOR THE CONTROL AND DISTRIBUTION OF VALUE BEARING ITEMS IN A PC POSTAGE SYSTEM

CROSS REFERENCE TO RELATED APPLICATION

This application claims priority to U.S. Provisional Patent Application Ser. No. 60/230,044, filed Sep. 1, 2000 and entitled "METHOD AND APPARATUS FOR THE CONTROL AND DISTRIBUTION OF FREE POSTAGE IN A PC POSTAGE SYSTEM", the entire contents of which is hereby expressly incorporated by reference.

FIELD OF THE INVENTION

The present invention relates to secure printing of value-bearing items (VBI), such as postage for letters and other items to be delivered by the United States Postal Service (USPS). More particularly the invention relates to systems and methods for controlling the distribution and expiration of free value-bearing items granted to customers of PC postage providers.

BACKGROUND

A significant percentage of the United States Postal Service (USPS) revenue is from metered postage. Generally, postage or any VBI may be printed by mechanical meters or computer-based systems. Conventionally, postage meters print metered postage in the form of a special mark, also known as postal indicia, on mail pieces. Conventionally, a business or other entity will have a postage meter at its place of business, and will use the meter to print postal indicia on mail pieces or on labels that are then affixed to the mail pieces.

The USPS has responded to recent technological developments in the telecommunication and computer field by developing its Information Based Indicia Program (IBIP) that provides specifications for the development of new technology to produce new forms of postage. In so-called PC Postage, a user will subscribe to a third party PC postage provider having a central server location. The subscriber may utilize postage software made available by the central server, to download postage value to the user's computer. The user can then print the postage indicia, by an ordinary laser or ink jet printer, directly onto the mail piece itself (onto a standard business envelope), or onto a label to be applied to the mail piece.

As an incentive to subscribe to their service, third party providers of PC postage or other VBIs often offer potential new subscribers free postage value or other promotional incentives. Currently, PC postage providers credit the entire amount of free postage value to a new subscriber's meter when the customer signs up for the online postage service. The user may utilize the postage value credited to their meter to print postage indicia onto a mail piece or onto a label to be applied to a mail piece. The postage service provider must retain a large percentage of new subscribers to offset the liability incurred by providing free postage value to new subscribers.

The need to retain new subscribers is exacerbated by USPS regulations that prohibit the withdrawal of money (i.e. postage value) credited to a customer's postage meter. Therefore, postage service providers can not recoup free postage value credited to a customer's postage meter that is not used by that customer.

It would therefore be advantageous to provide a method and apparatus for controlling the distribution of free postage value in a PC postage system.

SUMMARY OF THE INVENTION

In one aspect of the present invention a method for controlling the distribution of expiring free postage value in a PC postage system includes transferring a first portion of the expiring free postage value to an available postage account, storing a second portion of the expiring free postage value in a free postage value, and zeroing the balance of the free postage account upon expiration of the free postage value.

In another aspect of the present invention, a method for controlling the distribution of expiring free postage value in a PC postage system includes storing the expiring free postage value in a free postage account, transferring a portion of said expiring free postage value from the free postage account to an available postage account when a client prints postage and zeroing balance of the free postage account upon expiration of the free postage value.

BRIEF DESCRIPTION OF THE DRAWING

These and other features, aspects, and advantages of the present invention will become better understood with regard to the following description, appended claims, and accompanying drawings where:

DESCRIPTION OF THE INVENTION

Figure 1:
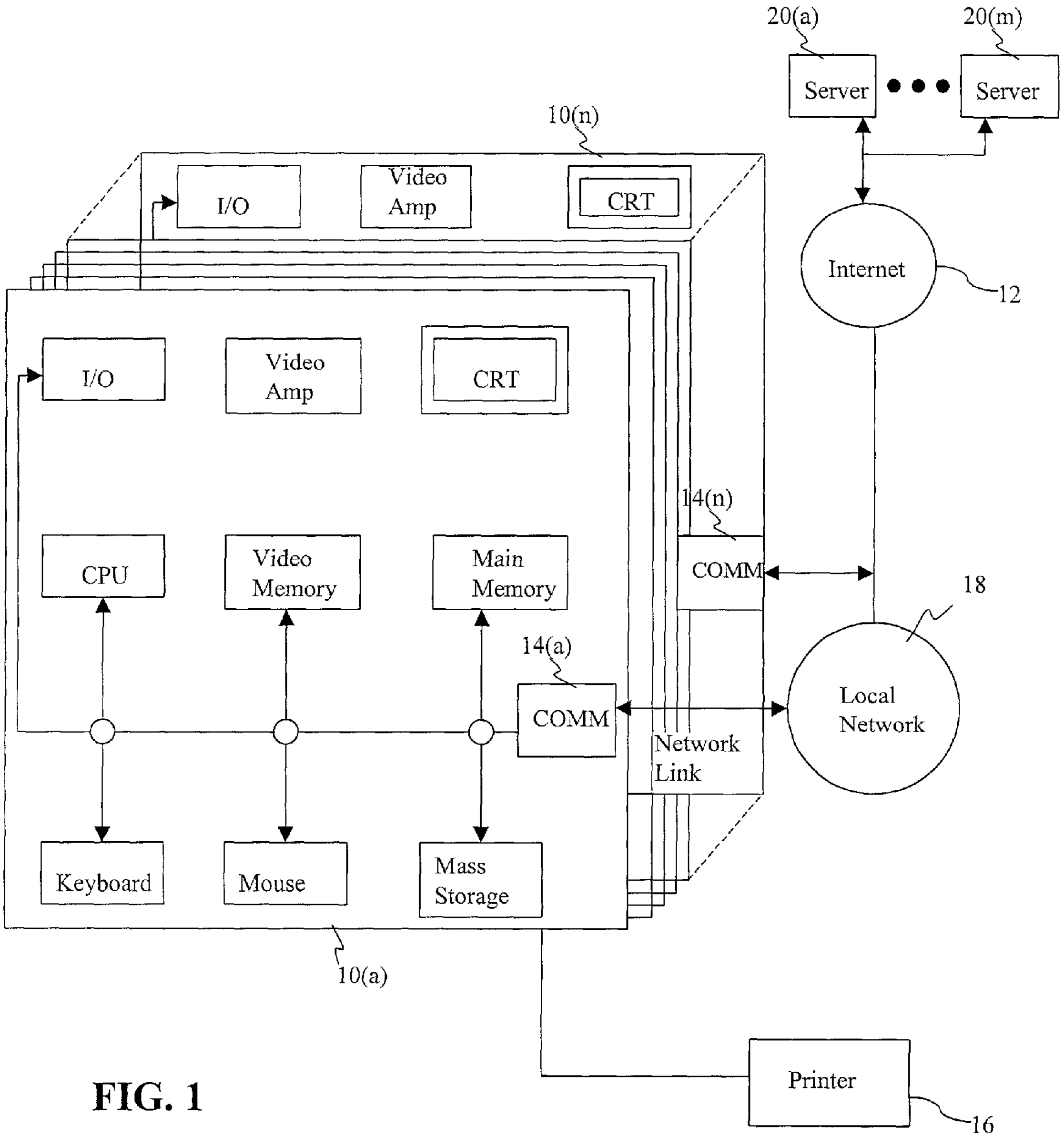
FIG. 1 is a simplified block diagram of an on-line PC postage system in accordance with an exemplary embodiment of the present invention.

In an exemplary embodiment of the present invention a customer's free postage value or other VBIs are made to expire after a specified time period, such as for example, thirty days after the customer signs up for the service. Controlling the time frame over which promotional items such as free postage value may be redeemed may reduce the overall cost of a promotional campaign. Also, the utilization of promotional items that expire after a predetermined time allows on-line providers of PC postage or other VBI to offer promotional items with an increased value (e.g., from $20 to $50) to new customers because the provider can reduce the cost of giving away the promotional item.

The advantages of the present invention may best be illustrated in the context of an exemplary embodiment, such as for example an on-line PC postage system. An example of one such PC postage system is described in U.S. patent application Ser. No. 09/163,993 filed Sep. 15, 1998, the entire content of which is hereby incorporated by reference as if set forth in full. The PC postage system includes an authentication protocol that operates in conjunction with the USPS. The system utilizes on-line postage system software comprising user code that resides on a client system and controller code that resides on a server system. The postage system allows a user to print a postal indicium at home, at the office, or any other desired place in a secure, convenient, inexpensive and fraud-free manner.

The described exemplary PC postage system comprises a client system electronically connected to a server system via a communication network. In one embodiment, the communication network comprises the Internet. It will be understood by those skilled in the art that the communication network may take many different forms, such as a local area network (LAN), wide area network (WAN), wired telephone network, wireless network, or any other network that supports data communication between respective entities. The server system is preferably capable of communicating with one or more client systems simultaneously. In the described illustrative embodiment the server system is in electrical communication with a USPS system.

In operation, a licensed and registered client of the on-line PC postage system sends a request for authorization to print a desired amount of postage. A postal security device (PSD) server determines whether the client's account balance is sufficient to cover the requested amount of postage, and if so, communicates an authorization to the client system.

The client system then sends image information for printing a postal indicium for the granted amount to a printer so that the postal indicium is printed on the print media, such as for example, an envelope, post card or label. The printed indicium appears as a two-dimensional bar code that includes a unique serial number, mail delivery point information, and the amount of postage. Once the postage information is printed on an individual piece of mail, it may be mailed and processed by the USPS.

One of skill in the art will appreciate that the present invention is not limited to the disclosed PC postage system. Rather the present invention may be utilized in any PC postage system or systems that provide validation and printing of VBI in a Wide Area Network (WAN) environment. Therefore, the disclosed exemplary PC postage system is by way of illustration only and not by way of limitation.

FIG. 1 shows a block diagram of an exemplary Internet client/server environment used by an on-line PC postage system in one embodiment of the present invention. Client devices, 10*a*-10*n*, used by customers of the postage system may be connected to the Internet 12 through communication links 14*a*-14*n*. The server system may include postage servers, databases and cryptographic modules located in a highly secure facility. In the described exemplary embodiment, postage servers may include a string of servers 20(*a*)-20(*m*) connected to the Internet, for example, through a T1 line.

In accordance with an exemplary embodiment the server system may include a postal server subsystem that manages client and remote administration access to server functionality, authenticates clients and allows clients to establish a secure connection to the on-line VBI or PC postage system. The postal server subsystem also manages access to USPS specific data such as PSD information and a user's license information. The postal server subsystem queries the Postal portion of the Database subsystem for the necessary information to complete the task.

In addition, in an exemplary embodiment a postal x server (pxs) provides business logic for postal functions such as device authorization and postage purchase/register manipulation. Similarly the described exemplary server system may include among other things an e-commerce server that provides e-commerce related services on a user/group permission basis. In one embodiment the e-commerce server provides commerce-related services such as payment processing, pricing plan support and billing as well as customer care functionality and LDAP membership personalization services. An exemplary server system is further described in U.S. patent application Ser. No. 09/690,243, entitled "METHOD AND APPARATUS FOR ON-LINE VALUE-BEARING ITEM SYSTEM", filed Oct. 17, 2000, the entire content of which is hereby incorporated by reference as if set forth in full.

In accordance with an exemplary embodiment, when a user requests a PSD service, one of the available modules is loaded with data belonging to the user's account and the transaction is performed. When a module is loaded with a user's data, that module becomes the user's PSD. The database record containing each user's PSD data is referred to as the "PSD package". After each PSD transaction is completed, the user's PSD package is updated and returned to a database external to the module.

In one embodiment, the PSD package includes ascending and descending registers. In the described exemplary embodiment, the ascending register records the amount of postage value that is dispensed or printed on each transaction and the descending register records the value or amount of postage that may be dispensed and decreases from an original or charged amount as postage is printed. An exemplary PSD may further include a device ID, indicia key certificate serial number, licensing ZIP code, and the like.

The client devices 10(*a*)-10(*n*) may take many different forms, and in one illustrative embodiment comprise a personal computer. Alternatively, the client devices may comprise any other device that has processing capabilities and that may engage in communication over a communication network. Other examples are wireless display devices, cellular telephones, and other mobile devices. In the described exemplary embodiment, each PC has access to a printer such as printer 16.

Optionally, a local network 18 may serve as the connection between some of the PCs, such as the PC 10(*a*) and the Internet 12. Servers 20(*a*)-20(*m*) are also connected to the Internet 12 through respective communication links. The client software loaded on each of the PCs used by the clients preferably provides a print postage interface from which a user may define the postage that is to be printed.

In an exemplary embodiment of the present invention, clients receive free postage value or other VBI incrementally, in smaller amounts and the complete amount of free postage expires in a predetermined amount of time. In addition, an exemplary PC postage system maintains two different balances, namely available postage value and free postage value to control the distribution and expiration of the free postage.

In the described exemplary embodiment, the amount of postage value credited to the customer's account is the total free postage value but it does not reflect the actual free postage value in the customer's postage meter. The available postage value, that is, the amount actually credited to a customer's postage meter is credited in smaller increments. After a defined period of time (default may be for example thirty days), the free postage value balance is set to zero, and the customer is notified via e-mail, facsimile, letter or phone that the free postage value has expired.

In an exemplary embodiment of the present invention, the free postage balance represents the total amount of free postage value available to the user. In the described exemplary embodiment, there are two ways to transfer money from the free postage account to the available postage account. One embodiment, known as the smooth implementation, utilizes meter resets each time a customer prints postage. For example, if a customer attempts to print a $0.33 postal indicia from the print postage interface, the system resets the user's meter $0.33, and deducts $0.33 from the user's free postage balance.

In an alternate embodiment, known as the block implementation, the system preferably resets the customer's Meter with specified "blocks" of free postage when the user's available postage balance falls below a designated threshold. In the described exemplary embodiment the threshold does not include any postage purchased by the customer.

In operation, a customer may be offered, for example, $20 of free postage value when he or she signs up with a PC postage provider. The $20 free postage offer might start with $5 deposited in the user's meter and $15 held in the unused free postage account. When the available postage account balance in the user's meter falls below, for example, $1, the system increases the available postage balance in the user's meter by a predetermined amount such as, for example $5, bringing the available postage balance in the meter up to approximately $6.

In accordance with an exemplary embodiment of the present invention, the transferring of postage to a user's meter is transparent, so that the user only sees the amount of free postage they have remaining. Additionally, when postage is printed, an exemplary system preferably deducts postage value from the free postage amount first. The server may maintain two separate totals, namely the amount of postage actually in the meter and the amount available to the user through their service plan.

Figure 2:
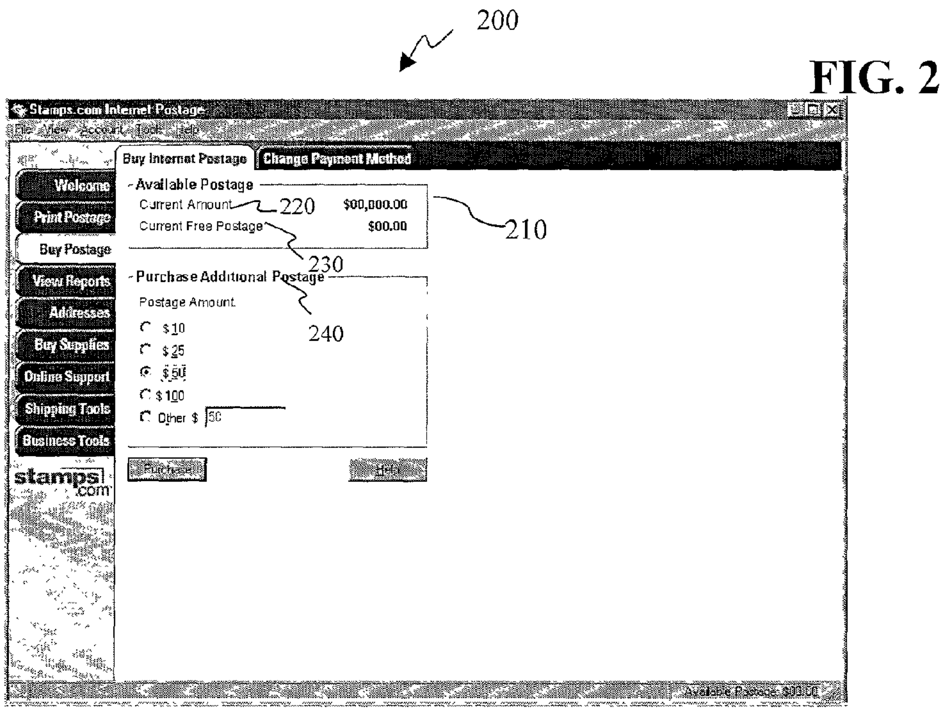
FIG. 2 is a screen capture of a purchase postage interface in accordance with an exemplary embodiment of the present invention.

An exemplary PC postage system preferably includes a buy postage interface or dialogue box 200 as shown in FIG. 2. An exemplary buy postage interface may include a summary of the available postage 210. The available postage summary preferably includes a purchased postage field 220 that the system may use to return the descending register. In addition, a free postage balance displays the total amount of expiring free postage value available to the customer 230. The purchased postage and the free postage balance are preferably dynamic and can be swapped out for a text string. The system may use a free postage meter to return the amount of free postage value moved from the free postage balance. An exemplary system may use a postage on hold field (not shown) to show that a transaction has been denied.

In the described exemplary embodiment, the buy postage interface also allows a user to purchase additional postage value 240. An exemplary buy postage interface preferably allows a user to purchase postage value in predetermined increments such as for example, 10, 25, 50 or 100 dollars by selecting one of a plurality of available postage amounts and clicking a buy postage button. In addition, a user may also purchase a random amount of postage value by entering the amount to be purchased in a text box and clicking buy postage.

In operation, an exemplary PC postage system executes the following logic when displaying the buy postage dialogue box. First, the system checks the meter summary, and then displays the available balance of purchased postage value, and free postage value in the credited postage fields. In operation an exemplary system determines if the free postage balance and the free postage value in the customer's meter are equal to zero. If not, an exemplary system displays the value in the free postage field. If the free postage balances are zero, then the system displays "Includes purchased postage" instead of the free postage field.

An exemplary PC postage system then checks to see if there is a postage on hold value. In the case where there is not a postage on hold value, the system may display a postage on hold value of $0.00 in the postage on hold field and preferably disables this field by graying it out. An exemplary system preferably displays the sum of the credited postage and the free postage in the total available postage field.

In the case where there is a postage on hold value an exemplary system checks to see if the total amount of expiring free postage value available is greater than zero. If so an exemplary system disables the free postage field by graying it out. The system may then display the following dynamic text at the bottom of the dialog box "Free Postage is unavailable until you have purchased postage for the amount on hold."

However, if the free postage balance is not greater than zero, the system preferably displays the following dynamic text at the bottom of the dialog: "Please purchase postage for the amount on hold." An exemplary system then displays the total available postage value (purchased postage–postage on hold) fields in the total available postage field.

Figure 3:
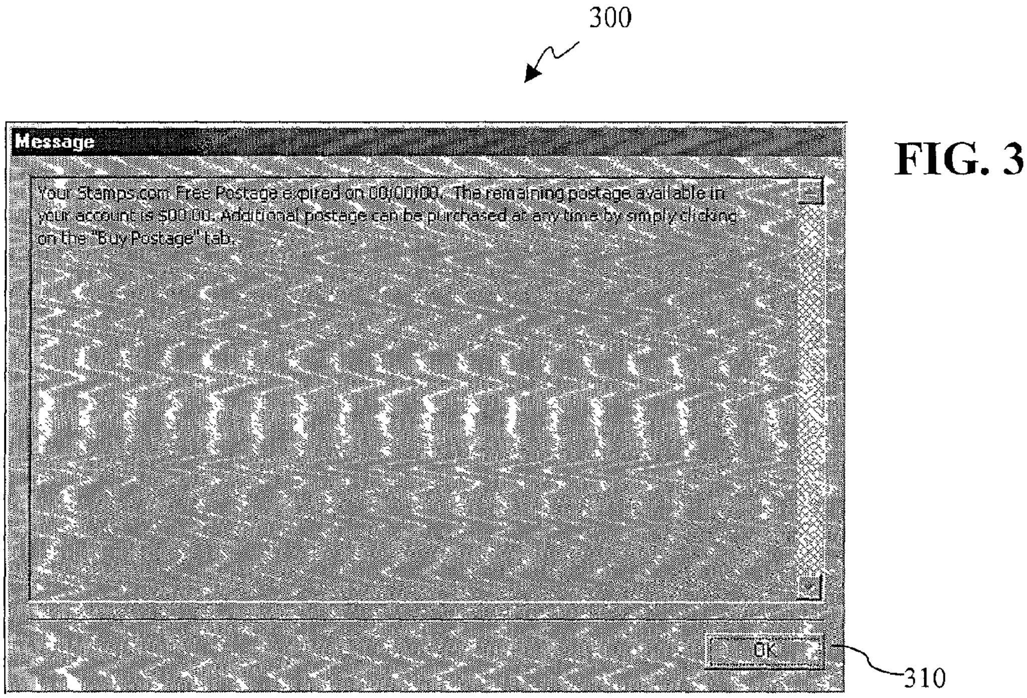
FIG. 3 is a screen capture of a dialogue box informing a user that the free postage value expired on a given date in accordance with an exemplary embodiment of the present invention.

Referring to FIG. 3, if a user's free postage value has expired prior to log-in an exemplary system preferably displays a client message dialogue box 300 stating that the free postage expired on a given date. Further the dialogue box may display the remaining postage available in the user's account and inform the user that additional postage may be purchased at any time by clicking the buy postage tab. In an exemplary embodiment, clicking "OK" 310 or closing the dialogue box returns the user to the application where the message dialogue box appeared.

Figure 4:
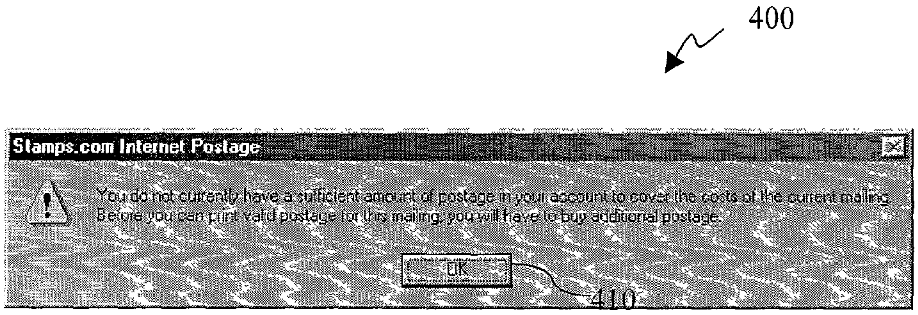
FIG. 4 is a screen capture of a dialogue box illustrating an error message displayed if free postage value expired prior to the time a user logged onto the PC postage system in accordance with an exemplary embodiment of the present invention.

Referring to FIG. 4, if a user's free postage value expires during a print transaction and there isn't enough purchased postage in the account to complete the transaction an exemplary system displays an error message 400. The error message may state, for example, "You do not currently have a sufficient amount of postage in your account to cover the costs of the current mailing. Before you can print valid postage for this mailing you will have to purchase additional postage." In an exemplary embodiment, clicking "OK" 420 or closing the dialogue box returns the user to the application where the message dialogue box appeared. In accordance with an exemplary embodiment, the client software may then refresh the registers.

Figure 5:
FIG. 5 is a screen capture of a dialogue box illustrating an error message displayed if free postage value expires during a print transaction and there isn't enough postage available in the meter in accordance with an exemplary embodiment of the present invention.

Referring to FIG. 5, if the free postage value expires during a print transaction and there isn't enough postage available in the meter an exemplary postage system displays an error message 500. An exemplary error message may read for example, "Your free postage expired during this transaction. To continue this transaction please purchase more Internet postage." In a preferred embodiment, clicking OK 510 or closing the dialogue box returns the user to the application where the message dialogue box appeared. In accordance with an exemplary embodiment, the client software may then refresh the registers.

In accordance with an exemplary embodiment, upon receipt of a print postage request, the server side software first credits free postage from the free postage account to the user's meter to ensure that the available expiring free postage is utilized before using a client's purchased postage. The smooth meter reset method utilizes meter resets at the time postage is printed. For example, if a client attempts to print an envelope with a postage amount of $0.33 an exemplary system performs a $0.33 meter reset for the user, and then deducts $0.33 from their free postage balance.

The "on demand" meter resets utilized by the smooth meter reset method may degrade the potential performance of the system because of the increased number of meter resets done for an individual client. However, the smooth reset method has the benefit of preventing already credited postage from remaining available after the expiration date and eliminates the float of money due to the postal service provider SDC from the USPS on withdrawn meters.

In accordance with an exemplary embodiment, a server that utilizes the smooth meter reset method will not print postage if there is no free postage available (used up or expired) and there is inadequate purchased postage available. Further the server may not print postage if the free postage database is unavailable. In this instance an exemplary system preferably registers a system failure and the client software responds appropriately. In an exemplary PC postage system, the purchased postage available does not include disputed amounts. If there is a disputed amount, customers will not be permitted to use their expiring free postage balance.

Figure 6:
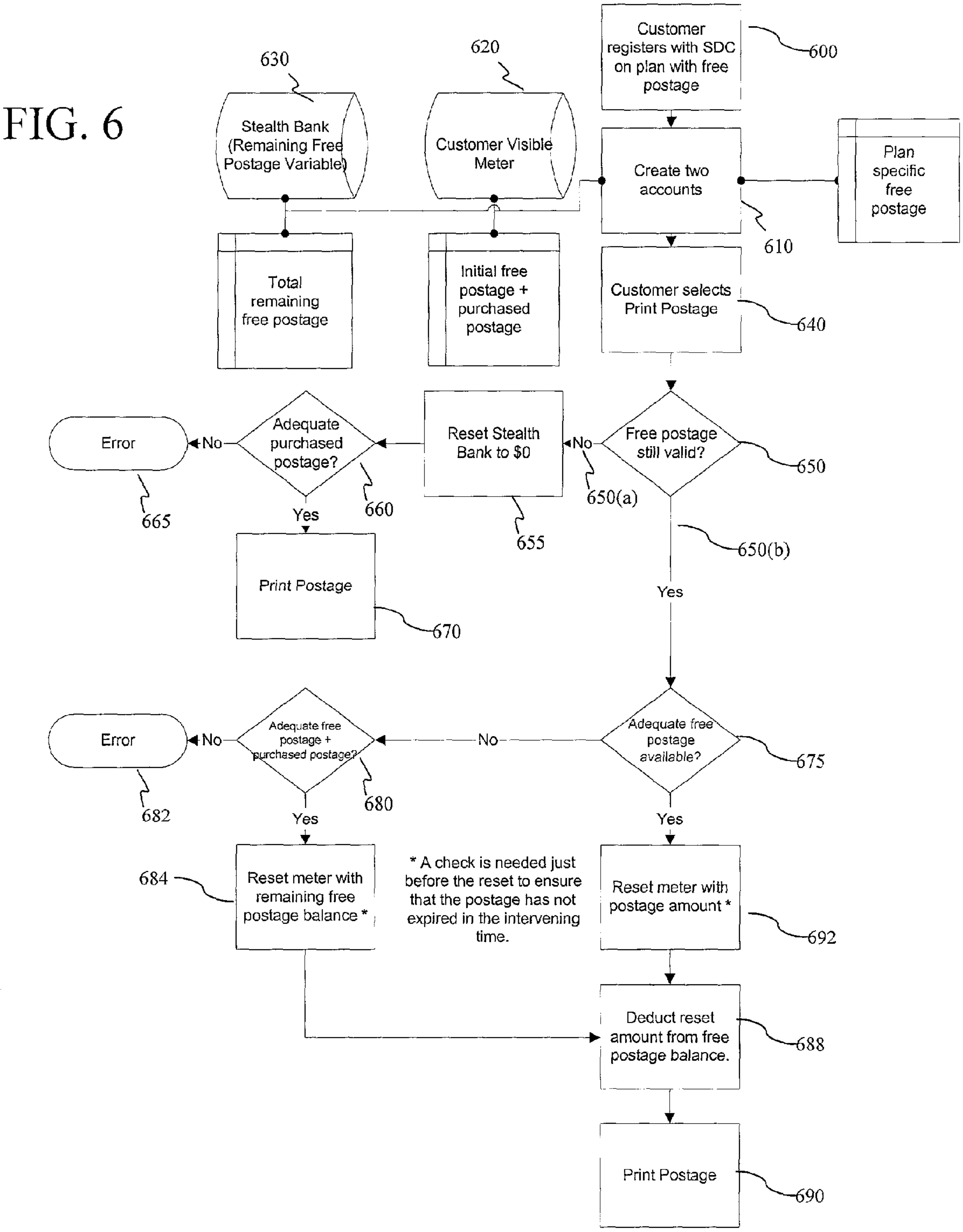
FIG. 6 is a logic flow diagram server system operation in accordance with a smooth meter reset method in accordance with an exemplary embodiment of the present invention.

FIG. 6 is a logic flow diagram illustrating the operation of a server system in accordance with the described exemplary smooth meter reset method. When a customer registers with a PC postage provider 600 the server software preferably establishes two accounts 610, plan specific free postage and promotional free postage. In the described exemplary embodiment, a customer's visible meter 620 will display the initial free postage plus the purchased postage. Further, a stealth bank (also referred to as the free postage account) 630 may be used to store the free postage.

In accordance with an exemplary embodiment, the system determines whether the free postage has expired 650 each time a customer attempts to print postage 640. If the postage has expired 650(*a*), an exemplary system may reset the stealth bank or free postage account to zero 655. The system may then determine whether sufficient purchased postage is available to cover the cost of the current transaction 660. If not, the system displays an error message 665. However, if there is sufficient purchased postage available the system prints the postage 670.

If the free postage has not expired 650(*b*), an exemplary system determines whether there is adequate free postage to cover the cost of the current transaction 675. If not the system preferably determines whether there is adequate free postage and purchased postage to cover the cost of the current transaction 680. If not the system displays an error message 682. If so the system preferably resets the free postage meter with the remaining free postage balance 684 and deducts the reset amount from the free postage balance or stealth bank 688 and prints the postage 690. In the case where there is sufficient free postage available to cover the cost of the current transaction, the system simply resets the user's free postage meter 692 with the postage amount. The system may then deduct the reset amount from the free postage balance or stealth bank 688 and prints the postage 690.

The block meter reset method resets the user's meter with specified blocks of free postage when the free postage meter falls below a predetermined threshold. The threshold preferably does not include any postage purchased by the customer. As an example a $20 free postage offer might start with $5 deposited in the user's free postage meter and $15 held in the unused free postage account. When the user's free postage balance in the free postage meter drops below a predetermined threshold, such as, for example $1, another $5 would be reset into the meter, bringing the free postage balance in the meter up to about $6.

The block meter reset method requires the PC postage provider to continue to wait for the USPS to refund any free postage remaining in withdrawn meter. Thus the block method may be less effective than the smooth method in lowering free postage costs to the PC postage provider because some free postage may remain in the customer's free postage meter after the free postage has expired. However, in operation the block method does not degrade system performance because meter resets for a given customer are not significantly increased.

In accordance with an exemplary embodiment, a server that utilizes the block meter reset method will not print postage if the free postage balance is inadequate or unavailable (used up or expired) and there is inadequate purchased postage available. Further the server may not print postage if the free postage database is unavailable. In this instance an exemplary PC postage system registers a system failure and the client software responds appropriately. In an exemplary PC postage system, the purchased postage available does not include disputed amounts. If there is a disputed amount, customers will not be permitted to use their expiring free postage balance.

Figure 7:
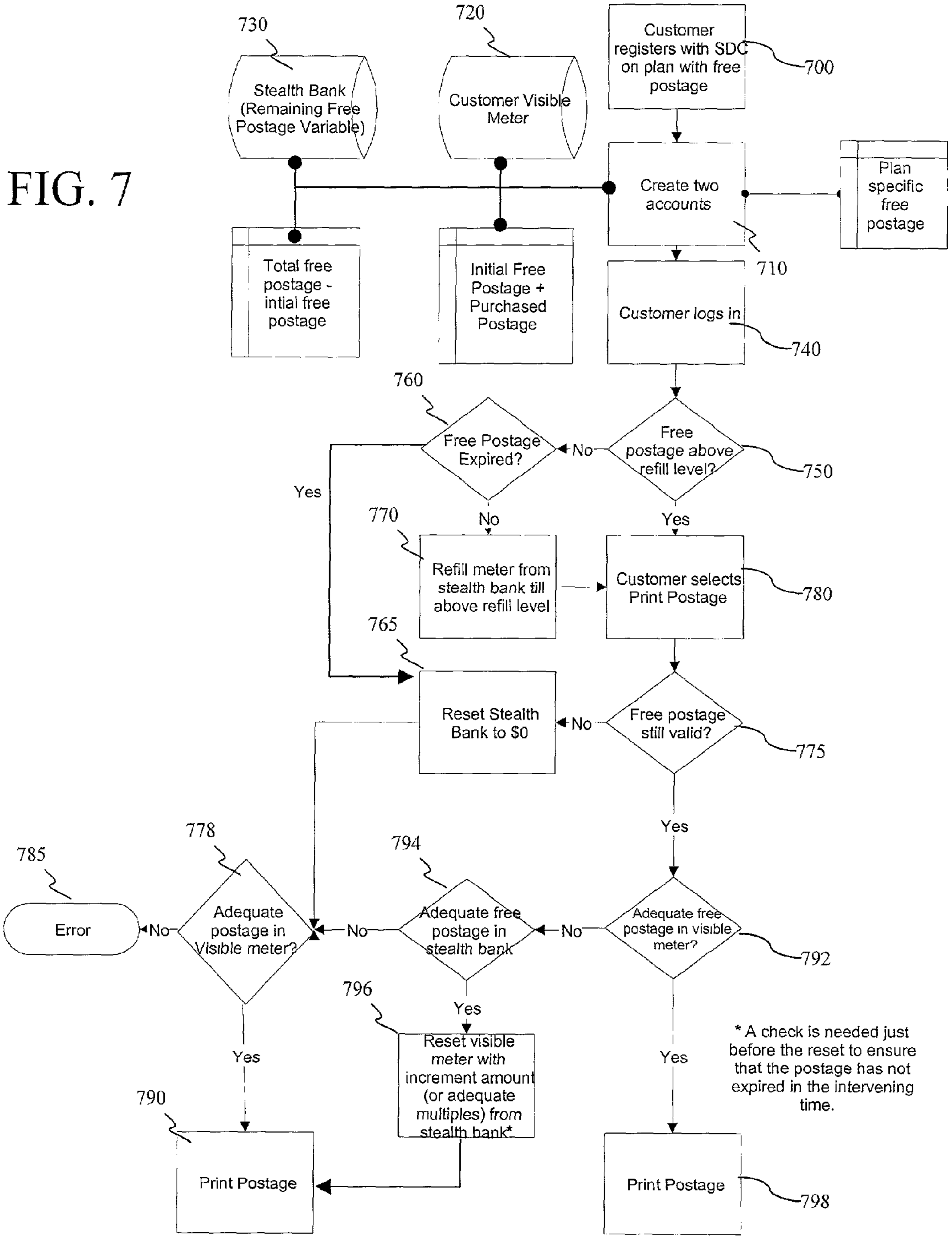
FIG. 7 is a logic flow diagram illustrating server system operation in accordance with a block meter reset method in accordance with an exemplary embodiment of the present invention.

FIG. 7 is a logic flow diagram illustrating the operation of a server utilizing the described exemplary block meter reset method. When a customer registers with a PC postage provider 700 the server software preferably establishes two accounts 710, plan specific free postage and promotional free postage. In accordance with an exemplary embodiment, the customer's visible meter will display the initial free postage plus the purchased postage 720. Further, a stealth bank (also referred to as the free postage account) 730 may be used to store the free postage.

When a customer logs-in 740 an exemplary system determines whether a free postage meter is above a predetermined refill limit 750. If not the described exemplary system determines whether the postage has expired 760. If the free postage has not expired the system transfers a predetermined block of free postage to the free postage meter 770. If the postage has expired the system preferably resets the stealth bank or free postage account 765.

If the customer then selects print postage 780 an exemplary system may again determine whether the free postage is still valid 775. If the postage is not valid, the system preferably resets the stealth bank or free postage account that is used to store the total available free postage to zero 765. The system may then determine whether there is sufficient total postage, including free and purchased postage in the customers visible meter to cover the cost of the current transaction 778. If not, the system preferably displays an error message 785. However, if there is sufficient total postage available in the customer visible mirror the system prints the postage 790.

If the free postage has not expired, an exemplary system determines whether there is adequate free postage in the visible meter to cover the cost of the current transaction 792. If not, the system preferably determines whether there is adequate free postage in the stealth bank or free postage account to cover the cost of the current transaction 794. If not the system determines whether there is adequate free postage and purchased postage to cover the cost of the current transaction 778. If not the system displays an error message 785.

If there is adequate free postage in the stealth bank to cover the cost of the current transaction, an exemplary system preferably resets the visible meter with the block increment amount or adequate multiples thereof from the stealth bank 796 and prints the postage 790. In the case where there is sufficient free postage in the visible meter to cover the cost of the current transaction the system simply deducts the postage from the visible meter and prints the postage 798. An exemplary system preferably determines whether the free postage has expired prior to the reset being performed.

An exemplary PC postage system preferably calculates expiration dates using the license issue date as day one. An exemplary system may then zero out the free postage in the early morning (e.g. 2-3 AM PT) of the day after the expiration date. For example, if the postage expires in sixty days, the described exemplary PC postage system may zero out the free postage balance at 2:00 AM on the sixty first day.

When the expiration date occurs, an exemplary system preferably runs a process on the backend to zero out the expired free postage accounts. An exemplary system may then notify the client that their free postage has expired.

A PC postage provider may offer free postage as part of a pricing plan as well as in conjunction with a promotional campaign. If there is a difference between the number of expiration days between the promotional code and pricing plan, the system will use the longer of the two expiration periods to set the expiration date for all free postage. In an exemplary embodiment, if one of the free postage types does not have an expiration period, then neither will have an expiration period.

Figure 8:
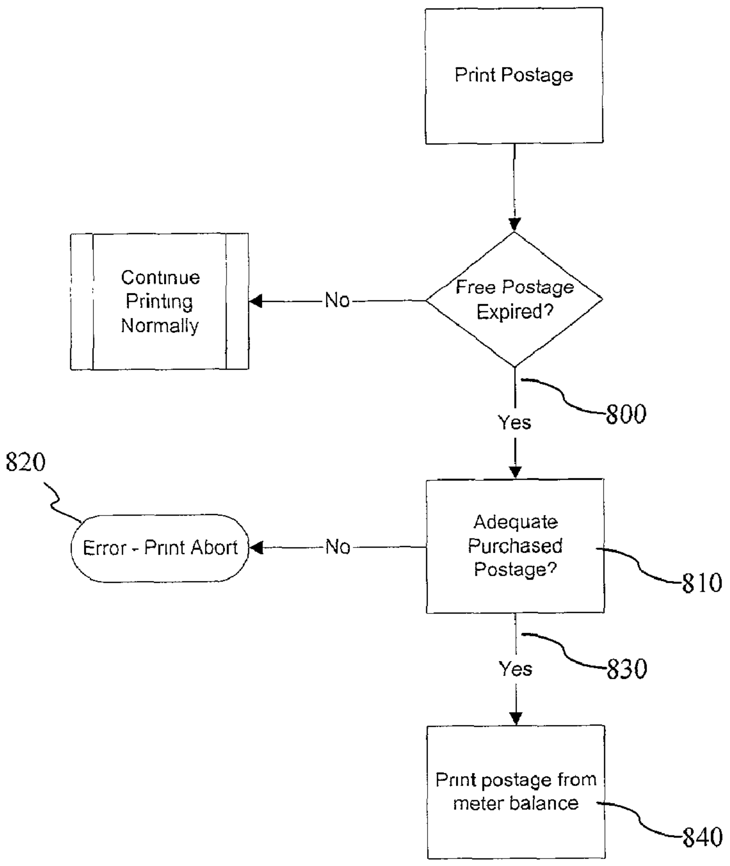
FIG. 8 is a logic flow diagram illustrating the control of expiring free postage value in accordance with an exemplary embodiment of the present invention.

Referring to the logic flow diagram of FIG. 8, if a user is midway through a postage print process when their free postage expires 800, an exemplary system determines whether there is adequate purchased postage to cover the price of the current transaction 810. If not an exemplary system displays an error message 820. If, however, there is adequate purchased postage to cover the cost of the current transaction 830 an exemplary system prints the postage and deducts the postage amount from the meter balance 840.

An exemplary system will not print postage if the free postage balance is inadequate or unavailable (used up or expired) and there is no or inadequate purchased postage available or if the free postage database is unavailable. In this instance an exemplary system preferably registers a system failure and the client software responds appropriately. In an exemplary PC postage system, the purchased postage available does not include disputed amounts. If there is a disputed amount, customers will not be permitted to use their expiring free postage balance. Otherwise the system preferably prints the postage using the available free postage first and then the purchased postage.

The interaction of the free postage account and the available free postage account to control the distribution of expiring free postage may be best demonstrated with a series of examples. The following examples demonstrate the operation of an exemplary PC postage system incorporating expiring free. For these examples it is assumed that there is no postage on hold. In a first example a user signs up with a PC postage provider and purchases $50 of postage. In addition, in the illustrated example the PC postage provider grants the new user $30 of expiring free postage so that the balances on the server and client are as illustrated in Table 1.

TABLE 1

| | |
|---|---|
| Server: | |
| Descending Register | $50 |
| Free Postage Balance | $30 |
| Free Postage in Meter | $0 |
| Disputed Amount | $0 |
| Client: | |
| Purchased Postage | $50 (Descending Register − Free Postage in Meter) |
| Free Postage | $30 (Free Postage Balance + Free Postage in Meter) |
| Postage on Hold | $0 |
| Total Available Postage | $80 |

Table 2 illustrates the client and server balances if the customer prints a $0.33 stamp on a PC postage system that utilizes the block meter reset method with a $5.00 reset value. As indicated $5 is transferred to the descending register upon initiation of the print transaction and the free postage balance is decremented accordingly. In addition the descending register and free postage meter are decremented in accordance with the print transaction. Further, the available free postage and the total available postage on the client side are decremented in accordance with the print transaction.

TABLE 2

| | |
|---|---|
| Server: | |
| Descending Register | $54.67 |
| Free Postage Balance | $25 |
| Free Postage in Meter | $4.67 |
| Disputed Amount | $0 |
| Client: | |
| Purchased Postage | $50 (Descending Register − Free Postage in Meter) |
| Free Postage | $29.67 (Free Postage Balance + Free Postage in Meter) |
| Postage on Hold | $0 |
| Total Available Postage | $79.67 |

Table 3 illustrates the server and client balances if a customer prints a $0.33 stamp and then has the free postage expire due to a lapse of the necessary period of time on a PC postage system utilizing the block meter reset method with a $5.00 reset value. As indicated $5 is transferred to the descending register upon initiation of the print transaction. In addition the descending register and free postage meter are decremented in accordance with the print transaction (in this example $0.33). In addition the free postage balance is decremented to zero upon the expiration of the free postage. Further, the available free postage and the total available postage on the client side are decremented to reflect the expiration of the free postage.

TABLE 3

| | |
|---|---|
| Server: | |
| Descending Register | $54.67 |
| Free Postage Balance | $0 |
| Free Postage in Meter | $4.67 |
| Disputed Amount | $0 |
| Client: | |
| Purchased Postage | $50 (Descending Register – Free Postage in Meter) |
| Free Postage | $4.67 (Free Postage Balance +Free Postage in Meter) |
| Postage on Hold | $0 |
| Total Available Postage | $54.67 (Purchased postage – Postage on hold) |

As a further example of the operation of an exemplary PC postage system, it is assumed that a customer utilizes all of the free postage granted to them by the PC postage provider except $4.67. It is assumed again that the PC postage system utilizes the block meter reset method and a $5 reset value. Table 4 illustrates the server and client balances for this case. In this instance all of the free postage has been transferred from the free postage account and the server free postage balance is zero. In addition, the $4.67 balance in the free postage meter after the expiration of the free postage can not be recouped. This is further reflected in the available free postage and total postage fields on the client side.

TABLE 4

| | |
|---|---|
| Server: | |
| Descending Register | $54.67 |
| Free Postage Balance | $0 |
| Free Postage in Meter | $4.67 |
| Disputed Amount | $0 |
| Client: | |
| Purchased Postage | $50 (Descending Register – Free Postage in Meter) |
| Free Postage | $4.67 (Free Postage Balance + Free Postage in Meter) |
| Postage on Hold | $0 |
| Total Available Postage | $54.67 (Purchased postage – Postage on hold) |

In another example of the operation of an exemplary PC postage system, it is assumed that a customer utilizes all of the free postage granted to them by the PC postage provider. It is further assumed that the PC postage system utilizes the block meter reset method with a $5 reset value. In this case the balances on the server and client are as illustrated in Table 5.

TABLE 5

| | |
|---|---|
| Server: | |
| Descending Register | $50.00 |
| Free Postage Balance | $0 |
| Free Postage in Meter | $0 |
| Disputed Amount | $0 |
| Client: | |
| Purchased Postage | $50 (Descending Register – Free Postage in Meter) |
| Free Postage (*field is now swapped out with text string) | $0 (Free Postage Balance + Free Postage in Meter) |
| Postage on Hold | $0 |
| Total Available Postage | $50.00 (Purchased postage – Postage on hold) |

The following examples demonstrate the operation of an exemplary PC postage system incorporating expiring free postage when there is postage on hold. In the described exemplary embodiment, customers may not utilize the free postage in the free postage meter in a print postage transaction when there is postage on hold. For purposes of demonstration it is again assumed that a user signs up with a PC postage provider and purchases $50 of postage. In addition, the PC postage provider grants the new user $30 of expiring free postage. It is further assumed that the customer has $50 on hold so that the balances on the server and client (as illustrate in Table 6) indicate that the free postage is unavailable (i.e. grayed out) and the available postage balance is zero.

TABLE 6

| | |
|---|---|
| Server: | |
| Descending Register | $50 |
| Free Postage Balance | $30 |
| Free Postage in Meter | $0 |
| Disputed Amount | $50 |
| Client: | |
| Purchased Postage | $50 (Descending Register – Free Postage in Meter) |
| Free Postage (*grayed out) | $30 (Free Postage Balance + Free Postage in Meter) |
| Postage on Hold | $50 |
| Total Available Postage | $0.00 (Purchased postage – Postage on hold) |

As another example, assume a customer prints a $0.33 stamp and then has $50 of postage on hold on a PC postage system that utilizes the block meter reset method and a $5 reset value. In this case the balances on the server and client as illustrated in Table 7 indicate that $5 was transferred to the descending register upon initiation of the print transaction and the free postage balance was decremented accordingly. Further, the descending register and free postage meter are decremented in accordance with the print transaction, (i.e. $0.33). Further the available free postage field on the client side is again grayed out indicating the free postage is unavailable and the total available postage is zero.

TABLE 7

| | |
|---|---|
| Server: | |
| Descending Register | $54.67 |
| Free Postage Balance | $25 |
| Free Postage in Meter | $4.67 |
| Disputed Amount | $50 |
| Client: | |
| Purchased Postage | $50 (Descending Register – Free Postage in Meter) |
| Free Postage (*grayed out) | $29.67 (Free Postage Balance + Free Postage in Meter) |
| Postage on Hold | $50 |
| Total Available Postage | $0.00 (Purchased postage – Postage on hold) |

As another example assume a customer prints a $0.33 stamp and then has $50 of postage on hold when their free postage expire. Again for purposes of demonstration a PC postage system that utilizes the block meter reset method and a $5 reset value is illustrated. In this case the balances on the server and client, as illustrated in Table 8, indicate that $5 was transferred to the descending register and free postage meter upon initiation of the print transaction.

Further the zero free postage balance on the server side indicates that the free postage has expired. However, the postage available in the free postage meter at the time the free postage expired may not be recouped. In addition, the postage on hold is again reflected in the unavailable or grayed out free postage and the zero balance for the total postage field on the client side.

TABLE 7

| | |
|---|---|
| Server: | |
| Descending Register | $54.67 |
| Free Postage Balance | $0 |
| Free Postage in Meter | $4.67 |
| Disputed Amount | $50 |
| Client: | |
| Purchased Postage | $50 (Descending Register − Free Postage in Meter) |
| Free Postage (*grayed out) | $4.67 (Free Postage Balance + Free Postage in Meter) |
| Postage on Hold | $0 |
| Total Available Postage | $0.00 (Purchased postage − Postage on hold) |

As a further example, assume a customer has purchased $80 of postage, has $30 of free postage and has $50 of postage on hold. Again for purposes of demonstration a PC postage system that utilizes the block meter reset method and a $5 reset value is assumed. In this case the balances on the server and client in Table 8 illustrate a free postage balance of $30 and available total postage of $30.

TABLE 8

| | |
|---|---|
| Server: | |
| Descending Register | $80.00 |
| Free Postage Balance | $30 |
| Free Postage in Meter | $0 |
| Disputed Amount | $50 |
| Client: | |
| Purchased Postage | $80.00 (Descending Register − Free Postage in Meter) |
| Free Postage (*grayed out) | $30 (Free Postage Balance + Free Postage in Meter) |
| Postage on Hold | $50 |
| Total Available Postage | $30.00 (Purchased postage − Postage on hold) |

As another example assume a customer has purchased $80 of postage, has $30 of free postage, prints a $0.33 stamp and has $50 on hold. Again for purposes of demonstration a PC postage system that utilizes the block meter reset and a $5 reset value is assumed. In this case the balances on the server and client as illustrate in Table 9, indicate that $5 was transferred to the descending register and free postage meter upon initiation of the print transaction. In addition, the free postage meter and descending register were decremented in accordance with the print transaction (i.e. $0.33). Further the client side available free postage and total postage balances reflect the $50 postage on hold.

TABLE 9

| | |
|---|---|
| Server: | |
| Descending Register | $84.67 |
| Free Postage Balance | $25 |
| Free Postage in Meter | $4.67 |
| Disputed Amount | $50 |
| Client: | |
| Purchased Postage | $80.00 (Descending Register − Free Postage in Meter) |
| Free Postage (*grayed out) | $29.67 (Free Postage Balance + Free Postage in Meter) |
| Postage on Hold | $50 |
| Total Available Postage | $30.00 (Purchased postage − Postage on hold) |

Figure 9:
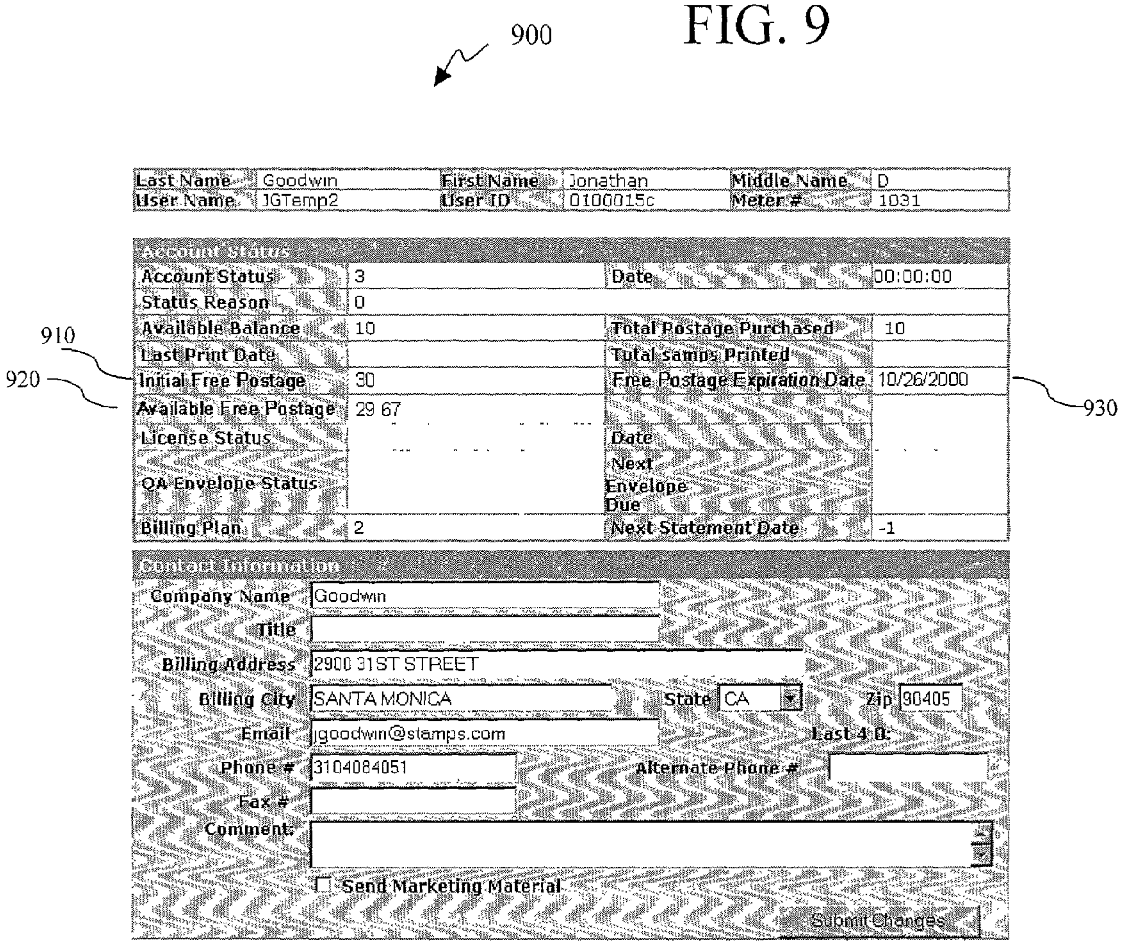
FIG. 9 is a screen capture illustrating a customer profile screen including an initial free postage field that displays the original amount of free postage value given to a user, the current balance of free postage available to the user a free postage expiration date field in accordance with an exemplary embodiment of the present invention.

Referring to FIG. 9, the described exemplary PC postage system may include a customer profile screen 900 that includes an initial free postage field 910 that displays the original amount of free postage given to a user. In an exemplary embodiment this field may not be edited. In addition, an exemplary customer profile screen may also include a current free postage field 920 that displays the current balance of free postage available to the user. In an exemplary embodiment this field may not be edited. An exemplary customer profile screen may also include a free postage expiration date field 930 that displays the current expiration date for the free postage. In an exemplary embodiment, the postage expiration date field may be edited by authorized personnel.

Figure 10:
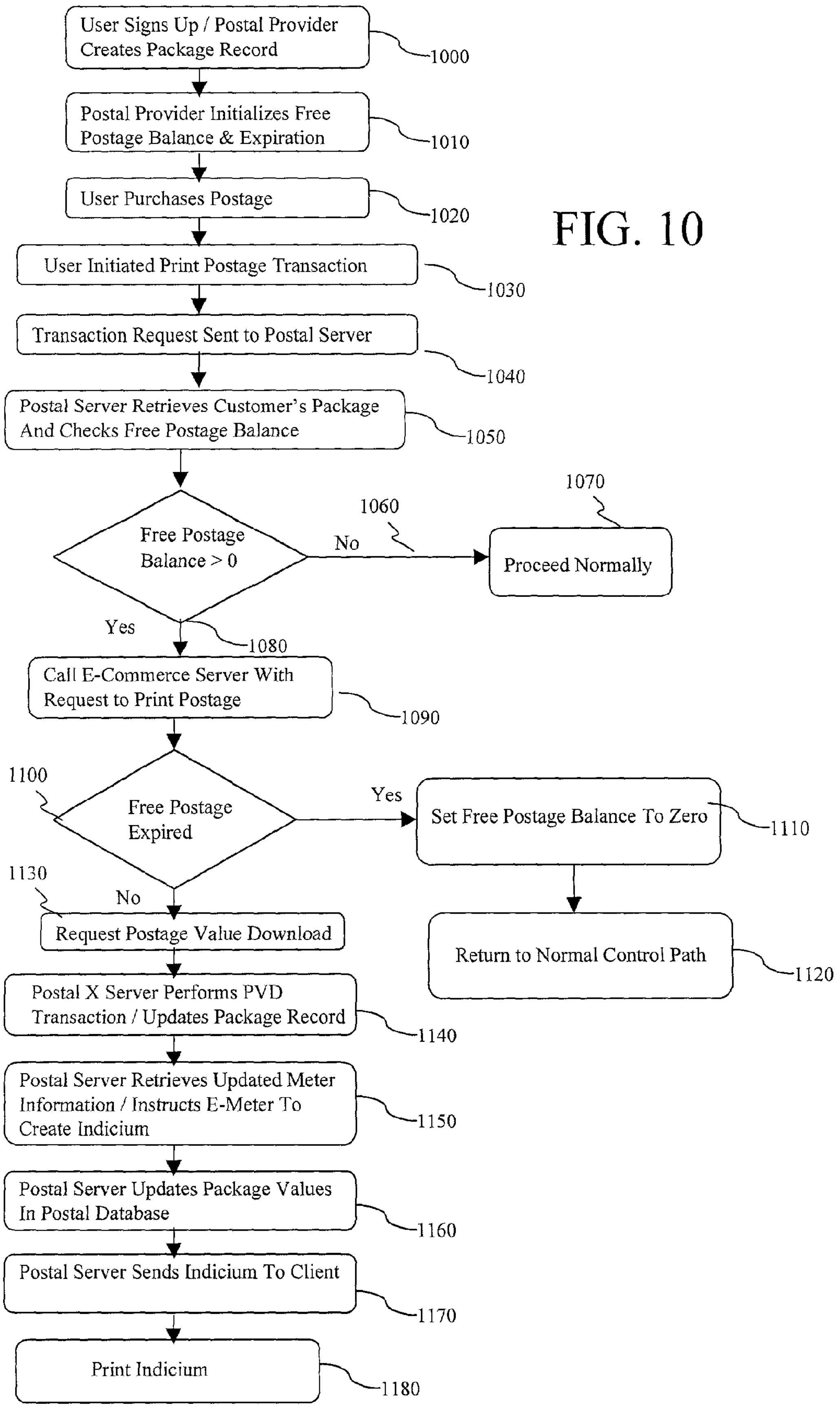
FIG. 10 is a logic flow diagram illustrating the operation of a PC postage system providing expiring free postage value in accordance with an exemplary embodiment of the present invention.

The control and distribution of expiring free postage may be further demonstrated by a representative transaction as illustrated in the flow chart of FIG. 10. Initially a users signs up with a PC postage provider. The postal server of the postage provider creates a package record for the customer 1000. The package record typical includes the summation of the postal security device (PSD) data, including for example, meter number, licensing post office, ascending register, descending register, and digital signature and free postage balance. In accordance with an exemplary embodiment the package record may be stored in a postal database and may be digitally signed to prevent unauthorized tampering.

If the customer signed up as part of a promotional campaign offering free postage the postal server initializes the free postage balance and sets an expiration date for the free postage 1010. The customer may choose to purchase postage 1020 and initiate a print transaction 1030, prompting the client server software to send a transaction request to the postal server 1040. The postal server retrieves the customer's package record and determines the balance of free postage available 1050. If the free postage balance is equal to zero 1060 the postal server returns to the normal printing process control path 1070.

If the free postage balance is greater than zero 1080 the postal server forwards a request to print postage to an E-Commerce server 1090. The E-Commerce server determines whether the free postage has expired 1100. If the free postage has expired the E-commerce server sets the free postage balance to zero 1110 and returns to the normal printing process control path 1120. If the free postage has not expired the E-Commerce server requests a postage value download (PVD) from the postal X server 1130. In the described exemplary embodiment the postal X server downloads the postage into the PSD, updates the package record data in the Postal database, and digitally signs the data 1140.

In the described exemplary embodiment the PSD provides the security-critical functions of the printing process. The core security functions may be performed by a hardware-based, cryptographic coprocessor module, that may be referred to as the E-Meter. An exemplary PSD is not itself the hardware device, but rather cryptographically protected state information that is loaded into the E-Meter and verified for each transaction performed against it. In the described exemplary embodiment, the free postage balance is decremented and a descending register representing the real-time monetary balance of postage available for use by a customer is incremented.

In the described exemplary embodiment, control of the transaction is returned to the postal server that retrieves the updated meter information and instructs the E-meter to create an indicium 1150. The postal server updates the package values in the postal database 1160 and sends the indicium data to the client system 1170 which in turn sends image information for printing the indicium to a printer 1180 to complete the print transaction.

Although a preferred embodiment of the present invention has been described, it should not be construed to limit the scope of the appended claims. Those skilled in the art will understand that various modifications may be made to the described embodiment and that numerous other configurations are capable of achieving this same result. Moreover, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention.

What is claimed is:

1. A method for controlling the distribution of expiring free postage value in a PC postage system, which free postage value is provided free of charge by a third party to a user and will expire after a time period has elapsed if such free postage is not used up by the user, as opposed to postage value owned by the user which will not expire after a period of time has elapsed, the method comprising the steps of:

the third party, providing by a computer server, expiring free postage value in a first portion and a second portion and the computer server transferring the first portion of said expiring free postage value provided by the third party to a user's postage meter where it is available for use by the user;

storing, in the third party computer server, the second portion of said expiring free postage value in a free postage account for the user, which second portion of said expiring free postage value remains unavailable for use by the user unless and until part of or all of the second portion is transferred by the computer server to the user's postage meter during a time period set by the third party;

transferring part of or all of the second portion, by the computer server, to the user's postage meter during the time period set by the third party;

determining, by the computer server, that the time period set by the third party has elapsed; and indicating to the computer server that the untransferred balance of said second portion of said expiring free postage value held for the user in the third party computer server is no longer useable.

2. The method of claim 1 further comprising the step of establishing a portion of free postage value from said free postage account at the third party computer server to said user's postage meter when the balance of said postage meter is less than or equal to said threshold.

3. The method of claim 2 further comprising the step of decrementing said free postage account in accordance with said block of the second portion of free transferred postage.

4. The method of claim 1 further comprising the step of storing purchased postage value in an available postage account.

5. The method of claim 4 further comprising the step of utilizing said expiring free postage value before said purchased postage value.

6. The method of claim 1 further comprising the step of displaying a sum of total expiring free postage value and purchased postage value in an available postage field.

7. The method of claim 6 further comprising the step of decrementing said available postage field in accordance with a print transaction.

8. The method of claim 7 further comprising the step of utilizing said expiring free postage value before said purchased postage value.

9. The method of claim 1 further comprising notifying user upon expiration of said free postage value.

10. The method of claim 1 further comprising the step of storing purchased postage value and balance of the postage meter in a descending register.

11. The method of claim 10 further comprising the step of decrementing the descending register in accordance with a print transaction.

12. The method of claim 1 further comprising the step of determining whether postage meter balance is equal to or greater than a predetermined threshold.

13. The method of claim 12 further comprising the step of transferring a block of the second portion of free postage value from said free postage account to said postage meter in accordance with said threshold determination.

14. The method of claim 1 further comprising the steps of determining validity of said expiring free postage value in response to receipt of a print postage request and wherein said free postage account is reset in accordance with said validity determination.

15. The method of claim 14 further comprising the step of determining whether balance of said free postage value is equal to or greater than a value of requested postage and transferring a block of free postage value from said free postage account to said postage meter in accordance with the amount determination.

16. The method of claim 15 further comprising the step of decrementing said free postage account in accordance with the transferred postage.

17. The method of claim 15 further comprising the step of generating print image in accordance with said amount determination.

18. The method of claim 14 further comprising the step of determining whether a balance of total purchased postage value and free postage value is equal to or greater than the value of requested postage.

19. The method of claim 18 further comprising the step of generating error message in accordance with said amount determination.

20. The method of claim 18 further comprising the step of generating print image in accordance with said amount determination.

21. A method for controlling the distribution of expiring free postage in a PC postage system, which free postage value is provided free of charge by a third party to a user and will expire after a time period has elapsed if such free postage is not used up by the user, as opposed to postage value owned by the user which will not expire after a period of time has elapsed, the method comprising the steps of:

storing untransferred expiring free postage value provided by the third party in a free postage account for the user at a third party computer server wherein the untransferred expiring free postage value remains unavailable and subject to expiration if not transferred by the computer server to the user within a time period set by the third party;

transferring by the computer server a portion of said expiring free postage value from said free postage account to a user's postage meter in accordance with a print postage request made before expiration of the time period; and resetting, by the computer server, to zero an untransferred balance of said free postage account for the user in the third party computer server after the time period has elapsed.

22. The method of claim 21 further comprising the step of decrementing said free postage account in accordance with said transferred postage value.

23. The method of claim 21 further comprising the step of displaying a sum of the expiring free postage value and purchased postage value in an available postage field.

24. The method of claim 23 further comprising the step of decrementing said available postage field in accordance with a print transaction.

25. The method of claim 24 further comprising the step of utilizing said expiring free postage value before said purchased postage.

26. The method of claim 21 further comprising the steps of determining the validity of said expiring free postage value in response to receipt of said print postage request, wherein said free postage account is reset in accordance with said validity determination.

27. The method of claim 26 further comprising the step of determining whether the balance of the free postage account is equal to or greater than a value of requested postage and wherein the step of transferring a portion of the expiring free postage value to said postage meter comprises transferring a portion of the expiring free postage value in accordance with the amount determination.

28. The method of claim 27 further comprising the step of decrementing said free postage account in accordance with the transferred postage value.

29. The method of claim 27 further comprising the step of generating print image in accordance with said amount determination.

30. The method of claim 26 further comprising the step of determining whether balance of total purchased postage value and free postage value is equal to or greater than value of requested postage.

31. The method of claim 30 further comprising the step of generating an error message in accordance with said amount determination.

32. The method of claim 30 further comprising the step of generating a print image in accordance with said amount determination.

33. A PC postage system that controls the distribution of expiring free postage value, which free postage value is provided free of charge by a third party to a user and will expire after a time period has elapsed if such free postage is not used up by the user, as opposed to postage value owned by the user which will not expire after a period of time has elapsed, the system comprising:

means for storing expiring free postage value, provided by a third party, to a user in a free postage account for the user at a third party computer server, the expiring free postage value in the free postage account at the third party server remaining unavailable for use by the user unless and until part of or all of such expiring free postage value is transferred by the computer server to a user's postage meter, and such untransferred expiring free postage value being canceled by the computer server after a period of time set by the third party if the expiring free postage value has not been transferred to the user's postage meter;

means for transferring a portion of said expiring free postage value from said free postage account to the postage meter of the user in accordance with a print postage request if the period of time has not elapsed; and means for resetting to zero an untransferred balance of said free postage account for the user in the third party server upon expiration of said free postage value after the time period has elapsed.

34. The PC postage system of claim 33 further comprising means for decrementing said free postage account in accordance with said transferred postage value.

35. The PC postage system of claim 33 further comprising means for displaying sum of the expiring free postage value and purchased postage value in an available postage field.

36. PC postage system of claim 35 further comprising means for decrementing said available postage field in accordance with a print transaction.

37. The PC postage system of claim 33 further comprising means for determining validity of said expiring free postage value in response to receipt of said print postage request, wherein said free postage account is reset in accordance with said validity determination.

38. A method of managing free postage in a computer postage system, which free postage is provided free of charge by a third party to a user and will expire after a time period has elapsed if such free postage is not used up by the user, as opposed to postage value owned by the user which will not expire after a period of time has elapsed, the method comprising:

generating, by a computer server, an account to track expiring free postage value separate from purchased postage value, which account is maintained by a third party in the computer server;

receiving, at the computer server, a request to print postage by a user's computer;

the computer server checking for expiration of the expiring free postage value in the account;

transferring a portion of unexpired free postage value to the user's computer; and after a time period set by the third party has elapsed, indicating to the computer server that an untransferred balance of said expiring free postage value held for the user in the third party computer server is no longer useable.

39. The method of managing free postage in a computer postage system of claim 38, further comprising: applying available free postage value to the request to print postage if free postage value is available; and applying purchased postage to the request to print postage if free postage value is not available.

* * * * *